United States Patent [19]

Hill

[11] 4,157,080

[45] Jun. 5, 1979

[54] INTERNAL COMBUSTION ENGINE HAVING COMPARTMENTED COMBUSTION CHAMBER

[76] Inventor: Craig C. Hill, Winter St., Lincoln, Mass. 01773

[21] Appl. No.: 802,077

[22] Filed: May 31, 1977

Related U.S. Application Data

[63] Continuation-in-part of Ser. No. 601,322, Aug. 1, 1975, abandoned, which is a continuation-in-part of Ser. No. 548,896, Feb. 11, 1975, abandoned.

[51] Int. Cl.² .............................................. F02B 25/12
[52] U.S. Cl. .............................. 123/53 B; 123/59 EC; 123/65 BA; 123/119 C; 123/119 CD; 60/624
[58] Field of Search .................... 123/26, 32 ST, 53 R, 123/53 A, 53 B, 59 EC, 65 B, 65 BA, 68, 119 C, 119 CD; 60/624

[56] References Cited

U.S. PATENT DOCUMENTS

| | | | |
|---|---|---|---|
| 691,017 | 1/1902 | Thomson | 123/53 A |
| 941,138 | 11/1909 | Frost | 123/53 A |
| 1,372,216 | 3/1921 | Casaday | 123/68 |
| 1,583,669 | 5/1926 | Davol | 123/30 B |
| 2,234,267 | 3/1941 | Mallory | 123/53 A |
| 2,468,157 | 4/1949 | Barlow et al. | 123/119 CD |
| 3,173,242 | 3/1965 | Erickson | 123/119 CD |
| 3,991,721 | 11/1976 | Hurd | 123/59 EC |

Primary Examiner—Charles J. Myhre
Assistant Examiner—Craig R. Feinberg

Attorney, Agent, or Firm—Wolf, Greenfield & Sacks

[57] ABSTRACT

The invention resides in a fuel efficient internal combustion engine employing a substantially constant volume combustion method and a moderate equivalent compression ratio. The engine has an air compressor connected to the intake port of the first cavity of a two cavity combustion chamber and substantially all the compression of the working medium is performed outside the combustion chamber by that compressor. In the combustion chamber, fuel and the compressed working medium are burned at substantially constant volume. Each cavity of the combustion chamber houses a piston whose motion alternately increases and decreases the cavity volume. The maximum volume of the first cavity is smaller than the maximum volume of the second cavity, to which it is connected by a duct. The duct connecting the two cavities serves as the only gas outlet of the first cavity and the only working medium inlet to the second cavity. Every downstroke of the piston in the first cavity is an intake stroke. On every upstroke of the piston in the first cavity, fuel mixed with the inducted compressed working medium is ignited and burned and the piston upstroke displaces the still unexpanded combustion gases out of the first cavity through the duct and into the second cavity, where the piston is in its downstroke. Every downstroke of the second cavity piston is both an intake and an expansion stroke, causing power to be produced. Every upstroke of the second cavity piston is an exhaust stroke.

2 Claims, 8 Drawing Figures

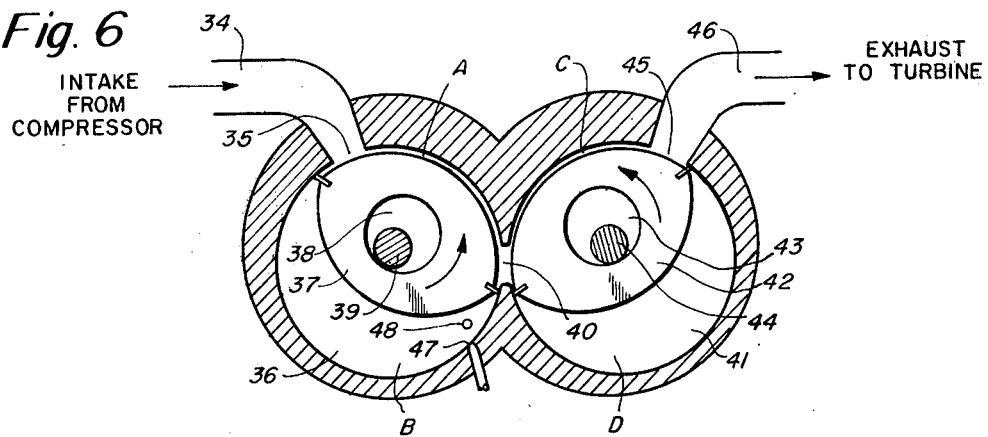
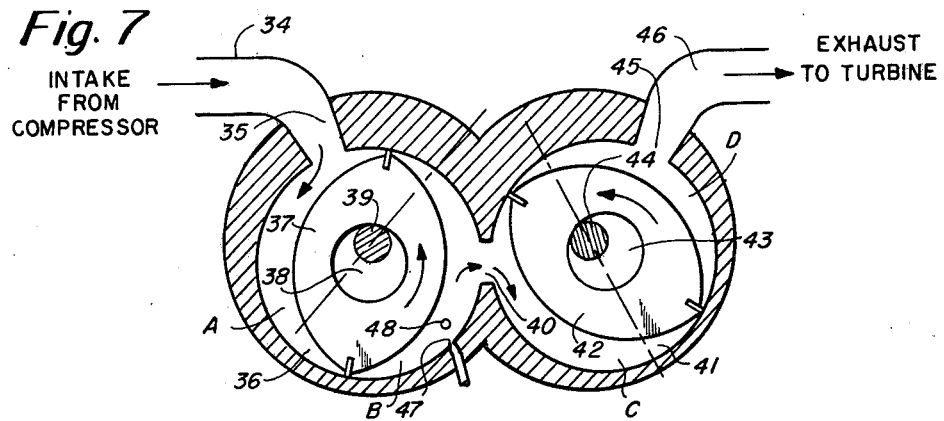
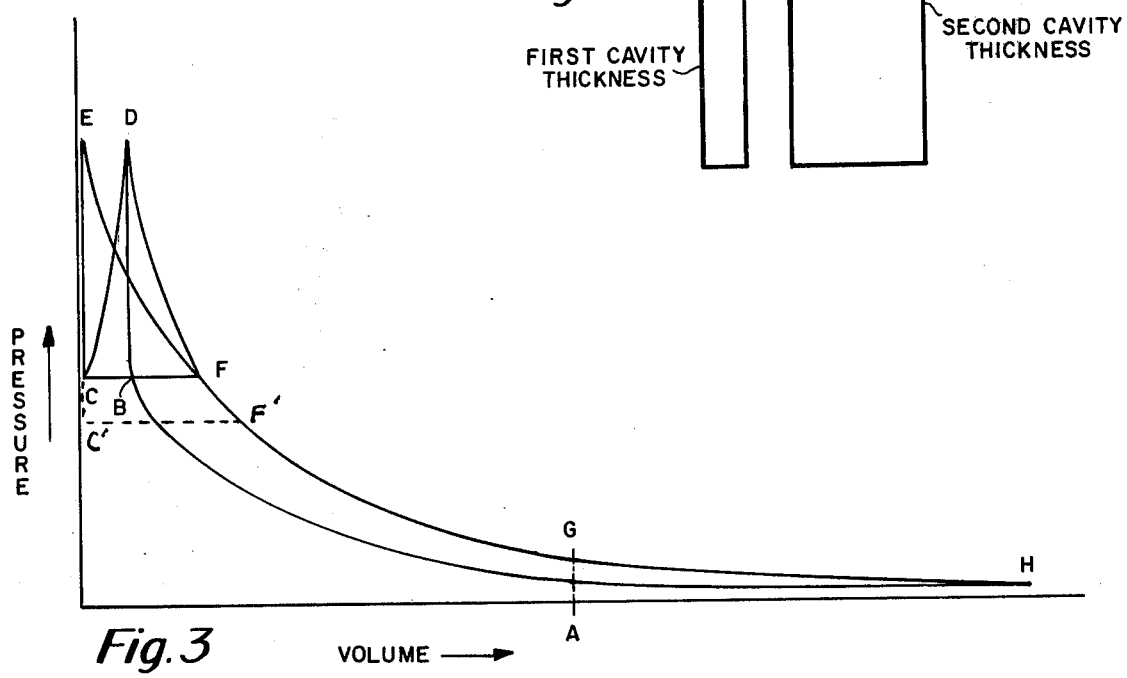

INTERNAL COMBUSTION ENGINE HAVING COMPARTMENTED COMBUSTION CHAMBER

RELATED APPLICATIONS

This application is a continuation-in-part of my earlier application Ser. No. 601,322 which was filed in the United States Patent Office on Aug. 1, 1975 now abandoned. That earlier application is a continuation-in-part of my parent application Ser. No. 548,896 which was filed on Feb. 11, 1975 now abandoned.

DISCUSSION OF THE INVENTION IN RELATION TO THE PRIOR ART

In theory, the difference between expansion stroke end pressure in the cylinder of an Otto cycle or similar conventional piston engine end atmospheric pressure represents an excellent source of energy which could be converted to additional shaft output in a compound expansion stage and thus used to increase the total work output of the engine very considerably without an increase in the amount of fuel burned. This is particularly true of spark ignition engines, where the pressure differential, cylinder to atmospheric, is typically large. In compression ignition engines this pressure head just before exhaust is in general relatively much smaller and the potential improvement in fuel economy by compound expansion is therefore much smaller. However, to reclaim the greatest possible percentage of exhaust pressure energy, the compound expansion means must utilize the full head of pressure existing between pre-exhaust cylinder pressure and ambient atmospheric pressure. If a positive displacement expansion means is used for this purpose, such as a piston reciprocating in a cylinder, engine size is greatly increased and heat loss, friction and flow losses tend also to increase to such an extent that little improvement in fuel economy is likely.

Use of a turbine as a compound expansion stage is inherently more promising than the use of a positive displacement device because turbines can exhibit very low friction loss and small size per unit output and are extremely simple and reliable in operation, as compared to most positive displacement devices. But while a blowdown exhaust turbine can be practically added to a piston engine in limited applications, as to drive a super-charger, a significant improvement in fuel economy by this means would also be improbable because the fluctuating inlet pressure causes blowdown turbines to be inefficient as energy conversion devices.

To utilize the full cylinder-to-atmosphere pressure drop with the best potential gain in overall thermal efficiency it is necessary to employ a turbine having a steady inlet pressure substantially equal to cylinder pressure at the end of the expansion stroke of the piston and having an outlet pressure of one atmosphere. But in a conventional spark ignition engine even this method is inherently impractical, both because of the high exhaust temperatures commonly encountered in spark ignition engines and because of the difference invariably existing between intake system pressure and the much greater expansion stroke end pressure. When this pressure difference is maintained in the cylinder of a four-stroke cycle engine by a constant-pressure exhaust stroke, the extremely hot high-pressure residual gas remaining in the clearance volume at the end of the exhaust stroke expands back into the lower pressure intake system when the intake valve opens. This hot back flow can potentially damage the intake valve and not only reduces specific output by reducing the volumetric efficiency of the engine but it also raises effective intake air temperature, thus increasing the probability of fuel detonation, and also increasing both combustion and exhaust temperatures, with deleterious effects such as increased nitrogen oxide emission, reduction in thermal efficiency and a further increase in the difficulty of employing a turbine having a limited sustainable inlet temperature. The invention removes or greatly reduces many of the described limitations on second-stage exhaust expansion as a method for improving fuel economy and it also makes possible the construction of embodiments where the thermal efficiency can be improved by making the first-stage expansion ratio in the engine greater than the previous total compression ratio. Engines embodying the invention differ in many respects from both two-stroke cycle and four-stroke cycle piston engines of conventional types.

When a steady-flow turbine is employed as a second-stage expansion means in an embodiment, most of the engine output can be by the turbine rather than by the first-stage expansion piston and the output from the first stage in some embodiments therefore, may be insufficient to drive the compressor. In such embodiments, the turbine is an essential part of the functioning engine rather than an accessory because the engine cannot operate without the turbine's output.

BRIEF DESCRIPTION OF THE DRAWINGS

FIG. 3 is a pressure-volume diagram showing the cycle of the FIG. 1 embodiment.

FIG. 6 schematically depicts an embodiment of the invention that is analogous to the FIG. 1 embodiment but employs rotary displacement members rather than reciprocating pistons.

FIG. 7 shows the same embodiment as in FIG. 6 but with the displacement members rotated to advanced positions.

FIG. 8 diagrammatically depicts the comparative volumes of the cavities in the FIG. 6 embodiment.

OBJECTS OF THE INVENTION

The primary object of the invention is to provide an internal combustion engine of high thermal efficiency which has low production of objectionable emissions such as oxides of nitrogen ($NO_x$).

Another object of the invention is to provide an internal combustion engine which achieves greater expansion of the working medium by utilizing a steady-flow turbine in a second expansion stage following a first expansion stage having a positive displacement element that is moved by the expanding gases to produce power.

Another object of the invention is to provide an internal combustion engine in which gases can be exhausted at the highest possible steady pressure without the energy wasting blowdown stage that is usually required with conventional engines to prevent destructive backflow of hot gases into the intake system.

It is an object of the invention to provide an internal combustion engine in which all or nearly all compression of the working medium is done by a multi-stage compressor permitting intercooling or aftercooling or both of the compressed medium to lower the temperature of the compressed medium and reduce the work of compression.

Another object of the invention is to provide an internal combustion engine requiring very small clearance volumes in the cylinders where combustion and first stage expansion occurs so that the proportion of residual hot combustion products that remain to mix with the inducted first charge can be appreciably reduced.

DESCRIPTION OF THE PREFERRED EMBODIMENTS

Figure 1:
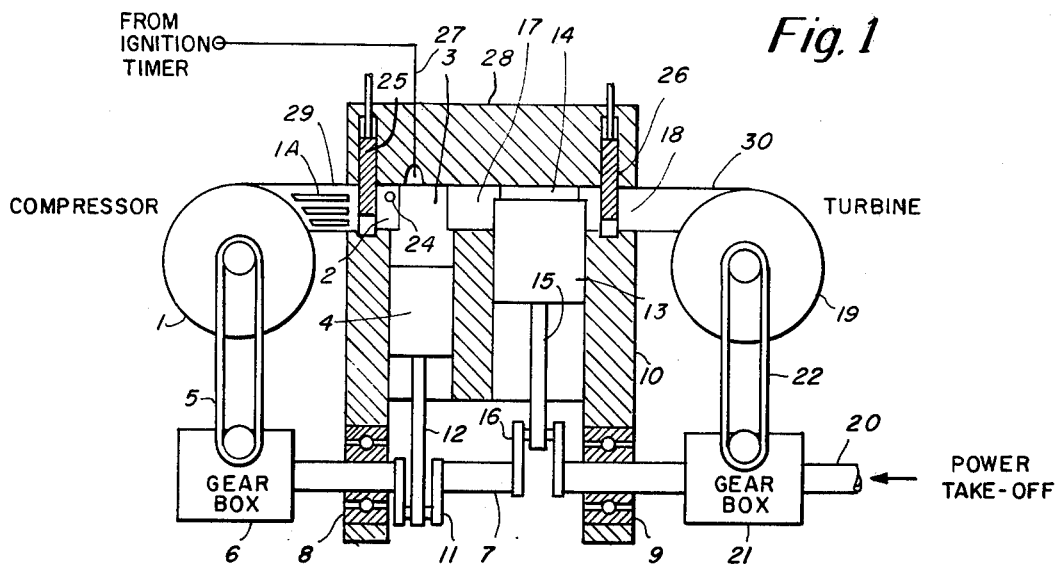
FIG. 1 schematically depicts a preferred embodiment of the invention in which the duct between the two cavities of the combustion chamber is always open.
Figure 2:
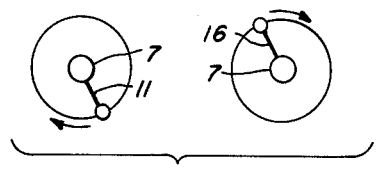
FIG. 2 diagrammatically shows the 180° phase difference between the pistons in the two cavities of the combustion chamber.

In the embodiment of the invention shown in FIG. 1, a compressor 1 compresses the working medium and supplies the compressed medium to the intake port 2 of a cylindrical cavity 3 whose volume is alternately increased and decreased by the reciprocation of a piston 4. For ease of exposition, the working medium is assumed to be air and the fuel is assumed to be a combustible liquid such as gasoline. The compressor is of any suitable type or combination of types and preferably has multiple stages with means between the stages to cool the compressed air. End density of the working medium in the delivery duct 29 outside intake port 2, is assumed to be approximately within the range of 5 to 10 times atmospheric density, roughly equivalent to a compression ratio of 5 to 10 in a positive displacement compressor. In FIG. 1 the compressor is shown to have an aftercooler 1A for further reducing the temperature of the compressed air prior to its induction into cavity 3 to assist in lowering the temperature attained in the combustion process in the engine and in the exhaust. The compressor is driven, for example, by a belt or chain 5 extending to a gear box 6 which receives its power from main shaft 7 which is journalled in bearings 8 or 9 of engine block 10. That arrangement for driving the compressor is exemplary only and obviously other arrangements can be used to drive the compressor. Piston 4 is connected to a crank 11 on the main shaft by a rod 12. In a similar manner, piston 13 in cylindrical cavity 14 is connected by a rod 15 to the crank 16 extending from the main shaft. The reciprocatory motion of piston 13 causes the volume of cavity 14 to alternately increase and decrease. The maximum volume of cavity 14, which is reached when piston 13 is at bottom dead center, is substantially larger than the maximum volume reached in cavity 3 when piston 4 is at bottom dead center. In this embodiment of the invention the pistons are arranged, as indicated diagrammatically in FIG. 2, so that the pistons are 180° out of phase. In FIG. 2 the relative positions of cranks 11 and 16 on the main shaft 7 are shown. Therefore, when one piston is at top dead center, the other piston is at bottom dead center and vice versa. Cavity 3 is connected to cavity 14 by a duct 17 which provides the only gas exhaust passage from cavity 3 and the only inlet into cavity 14 for the working medium. An intake valve 25 is opened on every downstroke of piston 4, permitting the working medium gases compressed by the compressor to be inducted into cavity 3. Valve 26 is opened during every upstroke of piston 13, permitting the contents of cavity 14 to be exhausted through exhaust port 18 into the turbine inlet duct 30. Valve 25 is closed during at least a major portion of the period of each upstroke of piston 4 and valve 26 is closed during at least a major portion of the period of each downstroke of piston 13. Inasmuch as pistons 4 and 13 are 180° out of phase, the compressed air inducted into cavity 3 during each downstroke of piston 4 is then displaced out of cavity 3 on each succeeding upstroke of piston 4 and moves through duct 17 into cavity 14 during the simultaneous downstroke of piston 13. At the start of this period cavity 3 is at maximum volume with piston 4 at bottom center stroke position. In both cavities, only the smallest practical clearance volume is provided when the pistons are at top dead center. Since cavity 14 is larger than cavity 3 in maximum volume, this gas transfer period from cavity 3 to cavity 14 is an expansion phase of the working medium.

When the engine is in operation, any suitable fuel introduction means can be employed to cause an ignitable mixture of fuel and air to be present in cavity 3 at approximately the end of each downstroke period of piston 4 or when intake valve 25 closes. In FIG. 1, an orifice 24 in cavity 3 allows fuel to be injected into the cavity during the induction stroke of the piston 4 or after valve 25 closes. Or, instead of employing direct injection of fuel into cavity 3, fuel can be introduced by carburetion or injection prior to induction into that cavity. An ignition means 27 such as a spark plug is located in cavity 3 and is preferably timed to ignite the fuel each time piston 4 is nearly at bottom dead center. At that time intake valve 25 is closed or almost so, piston 13 is at or near top dead center, and the total volume of the two cavities together is minimum or nearly so. To achieve the highest thermal efficiency, it is important to have the combustion process occur as rapidly as possible close to or during the period of several degrees before and after that minimum volume position inasmuch as the volume then remains nearly constant. During the following upstroke of piston 4 and the simultaneous downstroke of piston 13 in a first expansion phase, the combustion gases and heated working medium are transferred from cavity 3 into cavity 14 and power is produced by impelling piston 3 downward.

In the FIG. 1 embodiment, the first expansion stage is complete when piston 13 arrives at bottom dead center of each downstroke and piston 4 arrives simultaneously at top dead center of each upstroke. Only piston 13 is a power piston as every downstroke of piston 4 is only a period for intake of compressed working medium from the compressor. Intake valve 25 and exhaust valve 26 open substantially at this time and an intake phase then proceeds in cavity 3 on each downstroke of piston 4 while at the same time an exhaust phase occurs in cavity 14 on each upstroke of piston 13. Since duct 17 is always open, a pressure difference during this period between the compressed air entering cavity 3 and the expanded gases leaving cavity 14 will cause flow through duct 17 from the cavity at higher pressure to the cavity at lower pressure. By choice of the proper expansion ratio during the previous power stroke transfer from cavity 3 to cavity 14, the pressure in the cavities at the end of the expansion can be made equal to or less than the pressure provided by the compressor at the inlet port of cavity 3.

FIG. 3 illustrates this. In that figure, line AB represents the pressure rise across the compressor, with the pressure at B equal to the substantially steady pressure provided in compressor delivery duct 29. Line BD shows the ideal constant-volume combustion pressure rise in cavity 3 when piston 4 is at bottom dead center and valves 25 and 26 are closed. Line CE shows the simultaneous pressure rise in cavity 14, with piston 13 at top dead center and the clearance volume in cavity 14 extremely small. During the following 180° expansion phase, line EF illustrates the pressure drop in cavity 14 and line DC shows the simultaneous volume and pressure change in cavity 3 as piston 4 moves from bottom dead center, at point D, to the nearly zero clearance volume at point C. The volume of duct 17 is relatively small, with the dividing wall between the cylinders made as thin as practical and the cross sectional area of duct 17 only large enough to assure acceptably efficient gas flow during the transfer period. Piston 13 in cavity 14 reaches maximum volume position at point F just as piston 4 reaches minimum volume position in cavity 3 at point C. By proper choice of the fuel-air ratio during combustion and the expansion ratio during this transfer period the combustion pressure rise along lines BD and CE in the two cavities can be caused to be substantially equal to the expansion pressure drop in the cavities along lines DC and EF, thus making the pressures at the beginning and end of the period equal. Pressure in cavities 3 and 14 remains substantially equal at all times because they remain in communication through duct 17.

The inlet duct 30 of a turbine 19 is shown in FIG. 1 arranged to receive the gases exhausted from cavity 14 during every upstroke of piston 13. The turbine is turned by the gases and the power output is transmitted by a belt or chain drive 22 through gear box 21 to turn output shaft 20. Where the power obtained from piston 13 is insufficient to drive the compressor 1, the power for the compressor can be augmented by connecting the main shaft 7 to shaft 20 through gear box 21. Line FC in FIG. 3 shows the ideally constant pressure exhaust stroke of piston 13, from maximum cavity volume at point F to near zero at C, and line CB shows the simultaneous constant pressure intake stroke of piston 4, from near zero to maximum cavity volume at point B. If the pressure in the compressor delivery duct 29, the turbine inlet duct 30 and the two cavities is maintained substantially constant and equal during this period, little or no gas flow will occur between cavity 3 and cavity 14 during the simultaneous intake in 3 and exhaust in 14, despite the absence of a valve to block flow in duct 17. However, it is permissible and even beneficial to arrange a larger first-stage expansion ratio in cavity 14 which will cause working medium pressure in the cavities to fall below the compressor delivery pressure at point B in FIG. 3. Due to the larger expansion ratio, when valves 25 and 26 simultaneously open the pressure in cavities 3 and 14 will have dropped to the points C' and F', respectively. Air at high pressure from the compressor will therefore flow both into cavity 3 and through duct 17 into cavity 14 and back from the turbine inlet duct 30 into cavity 14, until the pressures equalize. Pressure fluctuation in the delivery duct 29 of the compressor and the turbine inlet duct 30 is preferably minimized by making the duct volumes large in relation to the displacement of the pistons. It is also permissible to open valves 25 and 26 at slightly different times, to prevent backflow from the turbine. When the colder compressed air is "short-circuited" in this way through duct 17, the air can assist in cooling the duct and the heat acquired by the air is thus regeneratively reclaimed and can be partly converted into additional work during expansion by the turbine.

Line FGH in FIG. 3 represents the pressure drop in the working medium expanded through turbine 19 of FIG. 1, from the constant inlet pressure at point F to atmospheric pressure at point H. Area ABDFGHA represents net positive work output of the engine per cycle, with ABFGHA representing the work output of the turbine and area DFBD showing approximately the net work of pistons 13 and 4, where EFCE equals the positive work of power piston 13 and DBCD the negative work of piston 4. In a conventional piston engine of similar total equivalent compression ratio the approximate ideal work output of the pistons is shown in FIG. 3 by the area ABDFGA. A comparison of areas makes it clear that in the invention most of the engine work output is produced by the turbine and a much smaller fraction by the power piston. In the conventional engine the area AGHA could theoretically be added by compounding a turbine to the engine but as has been discussed, such compounding is difficult with the conventional engine because among other reasons the pressure G at the end of the expansion stroke is higher than the intake pressure at A. It can also be realized from FIG. 3 that the displacement volume of the conventional engine cylinder is the volume at point A when the piston is at bottom dead center of the intake or expansion stroke, whereas the displacement volume of cavities 3 and 14 when the pistons are at bottom dead center in the FIG. 1 embodiment is shown respectively by the volume indicated at points B and F. The clearance volume in the cylinder of a conventional engine is shown by the volume at point B whereas in the invention the clearance volume is nearly zero as can be appreciated from the closeness of point C to zero volume on the volume axis, although both types of engines have equivalent compression density ratios. In terms of power strokes, the FIG. 1 apparatus performs one power stroke per shaft rotation compared to one power stroke to two shaft rotations in a four stroke cycle one cylinder piston engine and in that sense it can be understood that in mass air handling capacity and power stroke frequency pistons 4 and 13 together are equivalent to a two cylinder four stroke cycle engine where each of the two cylinders in the conventional engine has a maximum volume equal to that at point A with the piston at bottom dead center. Each piston of the conventional engine has a displacement volume equal to the difference between the volumes at points A and B and has a clearance volume in the cylinder with the piston at top dead center with a volume equal to the volume at point B. It is understandable from this comparison that embodiments of the engine can therefore be extremely compact, compared to four stroke cycle piston engines of most conventional types because the pistons in the combustion chamber apparatus can be very small in displacement volume relative to the mass of air they handle and because the turbine expansion stage can add greatly to total work output of the engine with a relatively small increase in engine size and weight. This also makes it clear that in comparison to a two cylinder equivalent four stroke cycle engine the embodiment of FIG. 1 has half the number of valves and igniters.

To limit maximum combustion temperature and gas temperature in the turbine inlet duct it is possible to limit the fuel-air ratio to a very lean equivalent value by a method of stratifying the fuel charge in cavity 3. In this method, introduction of fuel is coordinated with the intake period in cavity 3, causing the compressed air inducted during the first part of the downstroke of piston 4 to be fuel-lean and the compressed air inducted toward the end of the downstroke to be fuel-rich. Thus a stratified charge is formed in cavity 3 because the compressed air at the bottom and middle portions of the cylinder volume is fuel-lean while the medium at the top of the cylinder, inducted at the end of the stroke, is fuel-rich. Ignition of the charge by igniter 27 can be timed to ignite the rich fuel-air mixture nearly at bottom dead center of piston 4, before turbulence in the cylinder can dissipate the charge into a more or less uniform mixture in the cavity which may be too lean to ignite. While it was assumed that a fuel such as gasoline was used, it can be noted that hydrogen and some other fuels burn reliably and very quickly even at very lean fuel-air concentrations. Should hydrogen or fuels of similar combustion characteristics be employed, it is then feasible to use a method of fuel introduction which results in a uniformly distributed charge rather than one which is stratified, without appreciably altering engine efficiency.

To obtain a continuous stream of gases to drive the turbine, one or more additional arrangements of apparatus like that shown in FIG. 1 can be employed. In such structures, several two-cavity combustion chambers are arranged to receive compressed air from a common compressor delivery duct and to exhaust to a common turbine inlet duct. When such an arrangement is employed, the power pistons in the combustion chambers corresponding to piston 13 are timed to be out of phase so that exhaust gases from the different chambers are emitted at regularly spaced intervals to provide as continuous a gas flow to the turbine as possible. Since the first and second cavities of a combustion chamber can have any volume ratio desired, the first stage expansion ratio can be independent of any previous compression ratio. In effect, the invention permits the expansion ratio to be decoupled from the compression ratio. Also, the fact that the clearance volume between the cylinder head and the pistons when at top dead center can be very small, allows the fraction of hot residual gases that remain to mix with the colder intake gases to be greatly limited. The small clearance volumes therefore help reduce average gas temperatures attained in the operation of the engine and helps to limit both temperature-related losses affecting thermal efficiency and the formation of nitrogen oxides by keeping combustion temperature as low as possible for a given fuel-air ratio.

Figure 4:
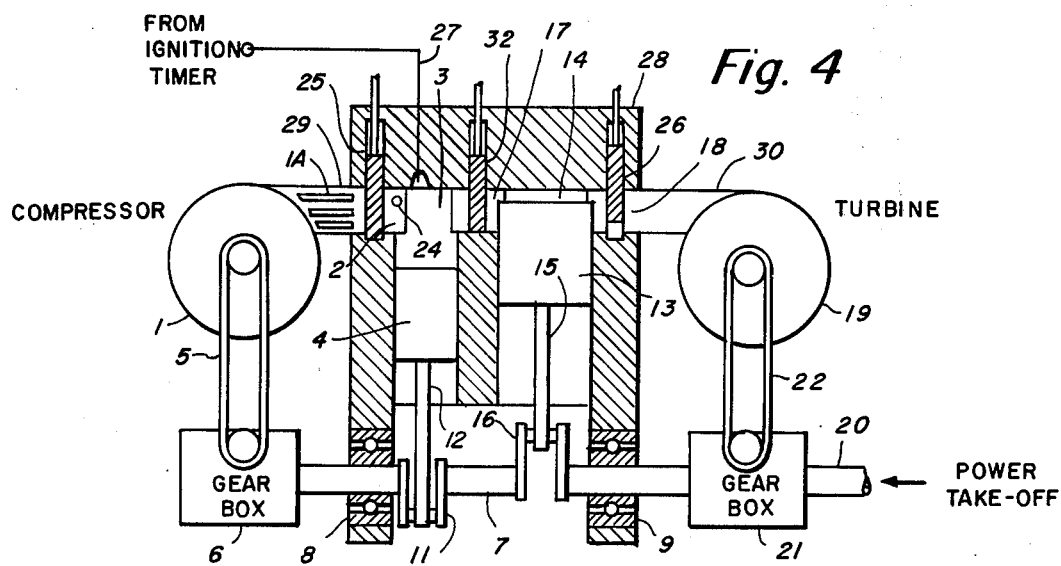
FIG. 4 depicts the scheme of an embodiment of the invention having a valve situated in the duct between the two cavities of the combustion chamber.
Figure 5:
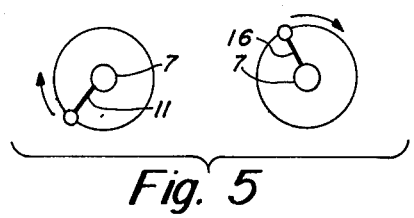
FIG. 5 diagrammatically shows a phase difference of somewhat less than 180° between the pistons in the two cavities of the combustion chamber.

Referring now to FIG. 4, essentially the same arrangement is shown as in FIG. 1 with the addition of a valve 32 in the duct 17. Assuming pistons 4 and 13 are 180° out of phase so that when one of those pistons is at its top dead center the other piston is at bottom dead center, the valve 32 is arranged to be 180° out of phase with valves 25 and 26. Therefore when valves 25 and 26 are closed, valve 32 is open. The employment of valve 32 eliminates any requirement of the FIG. 1 embodiment for having the gas pressures in the cavities at the end of the power stroke substantially equal to or less than the maximum intake pressure from the compressor. Because valve 32 is closed during the induction stroke of piston 4, air from the compressor cannot be short circuited to the turbine nor can the turbine inlet pressure cause a backflow of combusted gases back into the intake system. Furthermore, the expansion ratio in the first stage power stroke of piston 13 can be enlarged to any desired extent and the turbine second expansion stage can be omitted, since the thermal efficiency can still be high due to the large expansion ratio and a positive displacement compressor with an unsteady delivery pressure can be substituted for a compressor with a steady delivery pressure. The charge can be ignited by an igniter 27, such as a spark plug. When, in addition to the compression of the compressor 1, it is desired to have compression performed in cavity 3, piston 13 is arranged to be somewhat less than 180° out of phase with piston 4. Preferably at the start of combustion in cavity 3, valve 32 is open and piston 13 is at top dead center or close to it. The phase of the piston is approximately shown by the diagram of FIG. 5 which shows the positions of the cranks 11 and 16 on the main shaft 7. The downward movement of piston 13 during combustion of the fuel charge causes the increase in volume of cavity 14 to approximately offset the decrease in volume of cavity 3 by the upward movement of piston 4. Consequently, combustion, which proceeds rapidly, occurs at constant volume or substantially close to it. As the combusted gases expand, piston 13 is forced downward and causes the main shaft 7 to turn and drive the compressor. When piston 4 reaches approximately top dead center and the volume of cavity 3 is nearly zero, valve 32 then closes. After the end of the power stroke or close to it, exhaust valve 26 opens and the combusted gases exit at essentially constant pressure to the steady flow turbine 19 while the piston 13 moves upward to clear cavity 14 of substantially its entire gaseous content. A "steady flow" turbine is sometimes referred to in the technical literature as a "constant pressure" turbine, meaning the turbine utilizes a constant inlet pressure.

Although some compression can be accomplished in cavity 3, as explained above, that cylinder is not primarily a compression cylinder. In order to separate the compression means from the expansion means, the principal compression is always done by the separate compressor 1 and therefore a compressor which is separate from cavity 3 is an essential element of the invention. In all embodiments of the invention, it is practical and simple to maintain an expansion ratio that causes a pressure drop during the expansion phase that is nearly equal to or slightly greater than the pressure rise caused by combustion, with the desirable result that the intake pressure from the compressor can easily be made equal to or slightly different from the exhaust pressure to the turbine by coordinating the fuel burned per combustion period (i.e. the equivalent fuel-air ratio) with the expansion ratio. That attribute of the invention is especially important to the FIG. 1 embodiment because it permits the transfer valve 32 to be eliminated by adjusting the combustion conditions in conjunction with a selected expansion ratio to cause the end pressure of the expansion in cavity 13 to be substantially equal to the intake pressure.

The valve 32 in the FIG. 4 embodiment is in a difficult location for valve operation because of the high temperature flow to which it is subjected as the hot gases flow through duct 17. That valve may therefore have to be constructed of special and expensive material. To be effective, valve 32 must effectively seal duct 17 when the valve is closed. Difficulty in sealing may occur where the valve must withstand both heat and inertial stresses under conditions of pressure reverse where the seal must prevent leakage first from one direction and then from the other. Moreover, placing the valve in duct 17 tends to restrict flow and cause throttling losses because the valve cannot act instantaneously to be fully open or fully closed. Even if the sealing difficulty were overcome, the valve would probably still have to be cooled and thus add to engine heat loss. In addition, the power required to operate the valve reduces the available output power from the engine and contributes to total engine friction loss. Further, periodic valve maintenance or replacement may be needed and would contribute to engine operating expense. The embodiment of FIG. 1 is preferred to that of the FIG. 4 embodiment because the elimination of valve 32 avoids expense, complication, and loss of engine efficiency.

FIG. 6 schematically depicts an embodiment of the invention employing rotary displacement members rather than the reciprocating pistons employed in the embodiments illustrated in FIGS. 1 and 4. The embodiment of FIG. 6 is by analogy closer to the FIG. 1 embodiment than it is to the FIG. 4 embodiment. FIG. 7 shows the same embodiment as is depicted in FIG. 6 with the rotary displacement members advanced to other positions within their cavities.

As in the FIG. 1 embodiment, air from a compressor is supplied to the intake duct 34 which leads to the intake port 35 of the first cavity 36 of a two cavity combustion chamber. Disposed in cavity 36 is an intake rotor 37 arranged to turn about an eccentric 38 on a shaft 39. Cavity 36 is connected by a duct 40 to the second cavity 41 of the combustion chamber. An exhaust rotor 42 is disposed in the second cavity to turn about an eccentric 43 for movement about a shaft 44. Exhaust gases can exit from the second cavity through an exhaust port 45 which enables the exiting gases to flow through a passage 46 to a steady flow turbine.

The cavities are generally of the form of the inner envelope of the one lobed epitrochoid and the rotors each have two apexes. The comparative thickness of the cavities 36 and 41 is symbolically depicted in FIG. 8 from which it can be appreciated that the volume of second cavity 41 is considerably larger than the volume of first cavity 36. Inasmuch as the principles of construction, sealing, and rotation of rotary pistons of the trochoidal and epitrochoidal type are now well understood and are adequately set out in the technical literature, the mechanical details of the actual construction will not be described. The rotors 37 and 42 are shown arranged for rotation on two separate shafts 39 and 44 which are geared or otherwise linked together to maintain the two rotors in phase. Each rotor divides its cavity into two chambers, one of those chambers being an intake chamber and the other being an exhaust chamber.

In FIG. 6, rotors 37 and 41 are in rotational positions where the intake chambers A and C of cavities 36 and 41 are of minimum volume corresponding to the top dead center positions of the pistons 4 and 13 in the FIG. 1 embodiment. Exhaust chambers B and D in the cavities 36 and 41 of FIG. 6 are accordingly of maximum volume corresponding to the bottom dead center positions of reciprocating pistons 4 and 13. As depicted in FIG. 6, both intake port 35 and exhaust port 45 are closed by the rotors and the duct 40 which serves as the exhaust port for cavity 36 and the intake port for cavity 41 is also blocked by the rotors.

In FIG. 7, the positions of the rotors some degrees of rotation later are shown. In FIG. 7, the intake and exhaust ports of each cavity are uncovered. As the rotors continue to turn in the indicated direction, pressurized working medium from the compressor or from a reservoir flows at fairly constant inlet pressure into intake chamber A in cavity 36. While that induction is occurring, the contents in exhaust chamber D of cavity 41 exit at nearly constant pressure into the passage 46 which leads to the steady flow turbine. Although there are no valves to govern gas flow through the ports of the two cavities, flow is nevertheless governed by the positions of the rotors in relation to the ports and since intake chamber A in cavity 36 and exhaust chamber D in cavity 41 are not in communication during their simultaneous intake and exhaust periods, it is permissible to allow intake and exhaust pressures to be unequal and not constant.

Although the rotors 37 and 42 in the two cavities are in phase, transfer duct 40 connects chambers in the cavities which are substantially 180° out of phase with respect to the rotation of the rotors. Volumetrically the FIG. 6 embodiment provides a condition similar to that provided in the embodiment of FIG. 1, where the working members in the cavities are reciprocating pistons. In both the FIG. 1 and the FIG. 6 embodiments, the first cavity of the combustion chamber is substantially at its maximum cyclical volume when the second cavity is at its minimum cyclical volume and as the second cavity volume changes from its minimum to its maximum value, the first cavity's volume simultaneously changes from maximum to minimum and the working medium which was in the first cavity at its maximum volume is thereby transferred through the open transfer duct out of the first cavity and expanded at the same time in the second cavity. In both embodiments, compression is primarily performed by the compressor that precedes the first cavity. Fuel which is mixed with the working medium is ignited while the fuel-air mix is still located mostly or entirely in the first cavity. Combustion can occur in either cavity within the time interval of the gas transfer period between the first and second cavities of the combustion chamber. An important object of both embodiments is the reduction in compression work and in maximum combustion temperature which can be realized at a given equivalent fuel-air ratio by utilising a multi-stage compressor with intercooling between stages. However, such multi-stage compression is not a strict requirement of the invention. Embodiments can utilize single stage compression and positive displacement compressor means. A positive displacement compressor can be advantageously incorporated in an embodiment which is to be operated at a wide range of speeds. The reduction in maximum combustion temperature both reduces the formation of oxides of nitrogen in the combustion process and permits extremely effective utilization of a turbine second expansion stage because exhaust temperature from the combustion chamber can be kept low enough for direct utilization by a turbine while the substantially steady exhaust pressure from the combustion chamber can be relatively very high. This combination of relatively low exhaust temperature with relatively high exhaust pressure is in great contrast to the conditions obtainable in conventional internal combustion piston engines, where high exhaust pressure is in general correlated with high exhaust temperature, and low exhaust temperature with low exhaust pressure.

As indicated in FIG. 7, the intake into chamber A of cavity 36 occurs simultaneously with the first stage expansion phase in which working medium is transferred from exhaust chamber B of the first cavity through duct 40 into intake chamber C of the cavity 41, and simultaneously also with an exhaust phase in which the partially expanded working medium present in the exhaust chamber D of the second cavity 41 is being exhausted into passage 46 for subsequent second stage expansion in the steady flow turbine. In operation of the FIG. 6 embodiment, fuel can be introduced into the working medium at any point upstream of chamber D in cavity 41. Any suitable fuel or any combination of fuels can be used, and any suitable method of introducing the fuel can be used which causes an ignitable mixture of fuel and working medium to be present in the combustion chamber before the first expansion and transfer phase begins. As previously explained for the FIG. 1 embodiment, in the FIG. 6 embodiment fuel may be injected into an area within the first cavity to form a mixture which can be ignited after the end of the injection period and within a few degrees of rotor rotation from the commencement of the transfer-expansion period. In both the FIG. 1 and FIG. 6 embodiments, fuel may be injected and ignited as simultaneously as possible, starting at or before the time when the transfer begins from the first to the second cavities and continuing for a variable number of degrees depending on the level of output desired. Preferably fuel combustion is arranged to be as rapid as possible consistent with a desirably moderate rate of pressure rise. In the FIG. 6 embodiment a fuel injector is arranged to inject fuel into the cavity 36 through orifice 47 and an igniter 48 is located within the injected spray pattern.

While various embodiments of the invention are depicted in the drawings and described in the foregoing exposition, it is apparent to those familiar with heat engines that the illustrated embodiments can be modified in various ways and that the invention can be embodied in other forms. Indeed, some of the ways in which the illustrated embodiments can be modified are described in the foregoing exposition. It is not intended therefore, that the invention be restricted to the precise embodiments depicted or described. Rather, it is intened that the invention be delimited by the appended claims and include those heat engines that do not fairly depart from the essence of the invention.

I claim:

1. An internal combustion engine comprising
   (1) a compressor for compressing the engine's working medium,
   (2) a combustion chamber having first and second cavities in each of which there is a movable member whose motion in the cavity alternately increases and decreases the volume of a variable space in the cavity, the maximum volume of the variable space in the second cavity being larger than the maximum volume of the variable space in the first cavity, and the movable member of the second cavity being the only element of the pair of movable members to provide net positive work output,
   (3) the first cavity having an inlet port for induction of working medium compressed by the compressor,
   (4) a transfer duct connecting the first and second cavities and providing the only outlet for working medium from the first cavity and the only inlet for entrance of working medium into the second cavity,
   (5) the second cavity having an exhaust port for exhaust of the products of combustion,
   (6) means governing the motion of the movable members in the cavities whereby all or a substantial part of every period of decreasing volume of the variable space in the first cavity is concurrent with all or a substantial part of every period of increase in volume of the variable space in the second cavity and working medium is caused to be transferred through the duct from the decreasing first cavity space to the increasing second cavity space in every period of decreasing volume of the variable space in the first cavity,
   (7) means for adding fuel to the working medium to enable combustion to occur in the combustion chamber, whereby the pressure of the combusted gases impels the movable member in the second cavity in every period when the volume of the variable space in the second cavity is increasing and opposes the motion of the member in the first cavity in every period when the volume of the variable space in the first cavity is decreasing,
   (8) an igniter for igniting the fuel in the combustion chamber, and
   (9) timing means for initiating ignition in the combustion chamber when the volume of the variable space of the first cavity is substantially at its maximum.

2. An internal combustion engine in which the compression means and expansion means are separate elements, the engine comprising
   (1) a compressor for compressing the engine's working medium,
   (2) a combustion chamber having first and second cavities in each of which there is a movable member whose motion in the cavity alternately increases and decreases the volume of a variable space in the cavity, the maximum volume of the variable space in the second cavity being larger than the maximum volume of the variable space in the first cavity, and the movable member of the second cavity being the only element of the pair of movable members to produce net positive power,
   (3) the first cavity having an inlet port for induction in every period of increasing volume of the variable space in the first cavity of working medium compressed by the compressor,
   (4) a transfer duct connecting the first and second cavities and providing the only outlet for working medium from the first cavity and the only inlet for entrance of working medium into the second cavity,
   (5) the second cavity having an exhaust port for exhaust of the products of combustion from the second cavity variable space in every period of decreasing volume of that variable space,
   (6) means governing the motion of the movable members in the cavities to cause working medium to be transferred through the duct from the first cavity to the second cavity in every period of decreasing volume of the variable space in the first cavity and to cause the volume of the variable space in one cavity to be substantially at its maximum whenever the volume of the variable space in the other cavity is substantially at its mimimum,
   (7) fuel supply means for adding an amount of fuel to the working medium for each combustion period to cause the total pressure rise in the combustion chamber resulting from combustion of the fuel and any additional compression effected by the first piston to be approximately equal to the subsequent decrease in pressure resulting from the expansion that occurs due to the increasing volume of the variable space in the second cavity whereby the working pressure in the cavities of the combustion chamber at the end of each expansion period is approximately equal to or less than the pressure of the compressed working medium provided by the compressor at the inlet port of the first cavity, (8) an igniter for igniting the fuel in the combustion chamber, and
(9) timing means for initiating ignition in the combustion chamber when the volume of the variable space of the first cavity is substantially at its maximum.

* * * * *